Aug. 25, 1964 R. S. ANDERSON 3,145,893

MAGNETIC TAPE TRANSPORT APPARATUS

Filed June 26, 1962 2 Sheets-Sheet 1

RICHARD S. ANDERSON
INVENTOR.

BY White and Haefliger

ATTORNEYS

Aug. 25, 1964 R. S. ANDERSON 3,145,893

MAGNETIC TAPE TRANSPORT APPARATUS

Filed June 26, 1962 2 Sheets-Sheet 2

RICHARD S. ANDERSON
INVENTOR.

BY White and Haefliger
ATTORNEYS

United States Patent Office
3,145,893
Patented Aug. 25, 1964

3,145,893

MAGNETIC TAPE TRANSPORT APPARATUS

Richard S. Anderson, Encino, Calif., assignor, by mesne assignments, to Genisco Incorporated, Compton, Calif., a corporation of California Filed June 26, 1962, Ser. No. 205,315
5 Claims. (Cl. 226—170)

This invention relates generally to magnetic tape transport apparatus and more particularly concerns the advancing and guiding of magnetic tape with respect to magnetic head structure traversed by the tape.

In devices of the type with which the invention is concerned a tape carrying a magnetizable coating is advanced past a magnetic head structure so as to cooperate magnetically therewith as during sound recording or playback. For various reasons associated with non-uniform travel of the tape past magnetic head structure, which may be classified as perturbations, there arises what is known in the art as flutter in the signal produced by the head in response to tape travel during playback. Thus, for example variations in the normal force exertion of the tape against the head structure, which can give rise to flutter, may be due at least in part to variations in tape tension. The problem of flutter becomes acute when the tape or the head structure is subjected to extreme vibration or acceleration as for example may occur where the vehicle carrying the equipment undergoes vibration or acceleration.

The present invention makes possible a signficant reduction in the amount or degree of signal flutter accompanying operation of tape recording equipment, through the provision of a novel tape drive operating to isolate the tape portion traversing the magnetic head from external disturbances such as vibration and acceleration. The invention has additional benefits including the causing of the normal force exertion by the tape against the head structure to be substantially independent of tape tension for reducing flutter, the elimination of the prior need for what is known in the art as a pinch roller, and the provision of a tape drive including a belt characterized as a low-pass mechanical filter which does not transmit to the tape, i.e. filters out, the mechanical torque pulsations created by the belt drive motor.

In its broader aspects, the invention contemplates the provision of means including a drive belt movable to transmit drive to the tape through the belt thereby frictionally to drive the tape along a predetermined path traversing the head structure, the belt being tensioned to clamp the tape against the head during tape traversal thereof. As will be brought out, the principle of utilizing the same belt to drive the tape and also to clamp the tape against the head structure has the additional advantages of reducing the so-called air-bearing effect at high tape speeds due to the high degree of tension in the belt acting to prevent the tape from lifting away from the magnetic gap terminal of the head, such lifting otherwise tending to occur when a thin film of air is drawn by the high speed tape over the terminal of the head. Another advantage flowing from the use of the belt to drive the tape as will be described concerns the significant reduction in wear on the tape and the magnetic head as it traverses the head in contact therewith, which is made possible by a significantly reduced wrap angle of the tape over the head. A further advantage of such a drive consists in the elimination of need for a pinch roller to drive the tape.

Additional objects and advantages of the invention include the provision for centering and self-threading of the tape, and the provision for maintaining substantally constant tension in the drive belt in spite of temperature changes, which advantages result from the use of a seamless and non-stretching belt material having a coefficient of thermal expansion close to that of the frame structure supporting rollers which advance and guide the belt.

These and other objects and advantages of the invention, as well as the details of an illustrative embodiment, will be more fully understood from the following detailed description of the drawings, in which.

Figure 1:
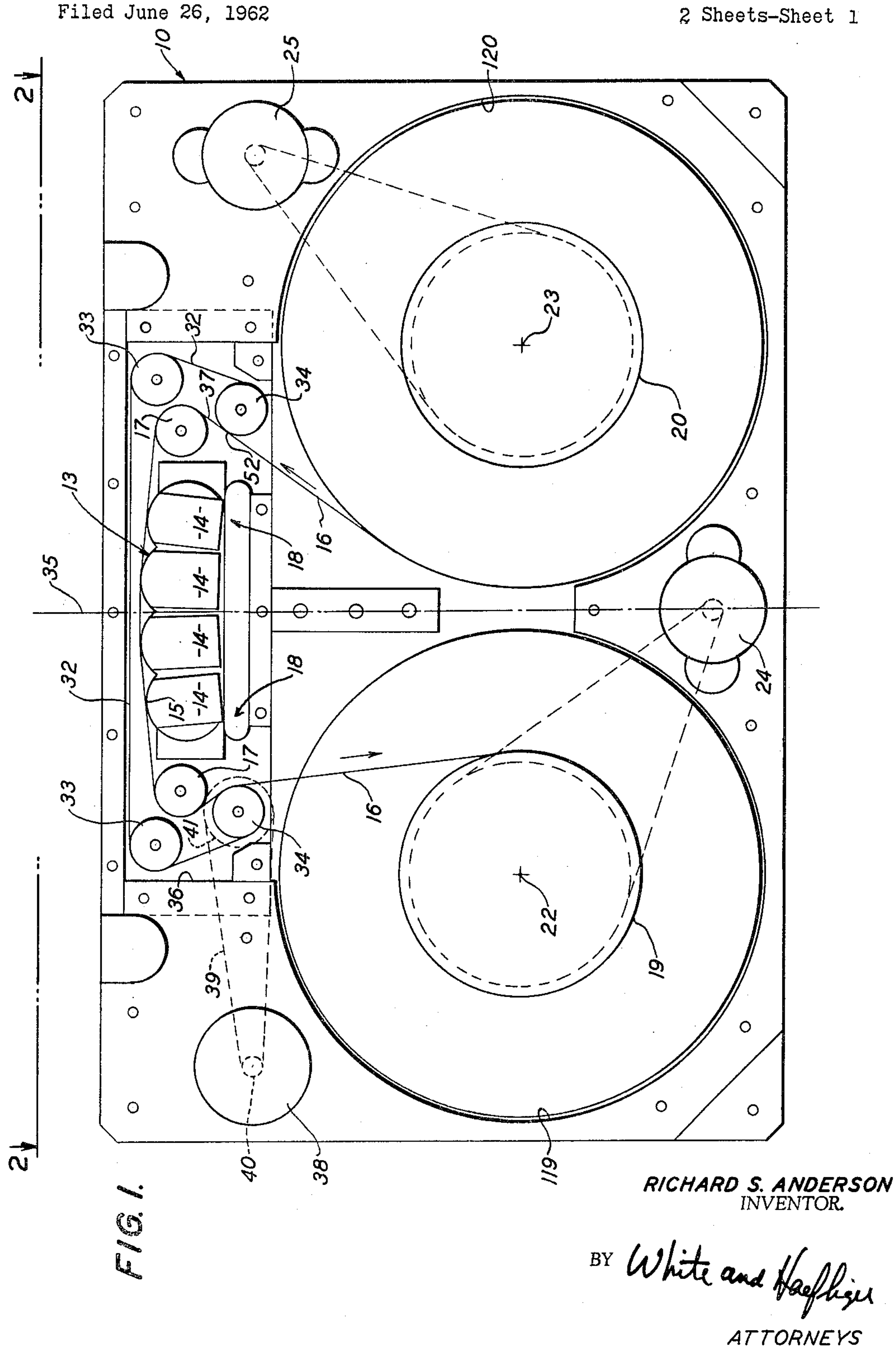
FIG. 1 is a plan view of the tape transport apparatus.

In the drawings the numeral 10 indicates generally a chamber or carrier having spaced plates 11 and 12 which may be suitably joined as by means of fasteners to provide a sandwiched assembly. In the space between the plates is located magnetic head structure 13 which in the embodiment shown takes the form of two record and two playback type heads 14 each of which may incorporate one or more magnetic core members forming slits or gaps at the terminals 15 of the head and across which a variable magnetic field is produced for variably magnetizing or responding magnetically to the magnetic tape 16 which traverses the head. As illustrated, the head terminals are typically convex toward the tape.

The magnetic heads are illustrated as being located between the pair of rollers 17 which act to turn or guide the tape in traversing relation to the magnetic head structure. As a result, the tape travels along a path which is slightly concave toward the head structure as illustrated.

Means for taking up and supplying the typically magnetically coated Mylar or acetate tape may include a pair of reels 19 and 20 located within chamber wells 119 and 120, the reels having parallel axes shown at 22 and 23. In this regard, the reels may be suitably driven in opposite rotary directions as by means of torque motors 24 and 25, the latter being carried by the chamber or carrier 10 and having drive shafts 26 and 27 for driving belts 28 and 29 which pass over the relatively larger sheaves 30 and 31 connected in driving relation to the reels 22 and 23 respectively.

In accordance with the invention, an endless drive belt 32 is movable to transmit drive to the tape thereby frictionally to drive the tape along a predetermined path traversing the head structure. Means for advancing and guiding the belt keeping the latter tensioned to clamp the tape against the head structure during traversal thereof typically includes a first pair of rollers 33, a second pair of rollers 34, and the third pair of rollers 17 previously mentioned. As shown in FIG. 1 the rollers of each pair are symmetrically located at opposite sides of a plane 35 normal to the plates 11 and 12 and bisecting the head structure 14. Also as is clear from FIG. 1, the rollers are confined within the chamber well 36 and have parallel axes of rotation.

Figure 2:
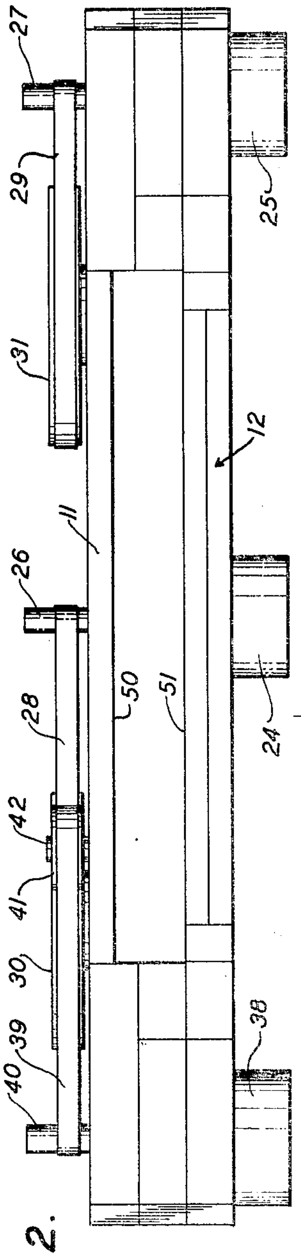
FIG. 2 is an elevation showing the exterior of the apparatus.
Figure 4:
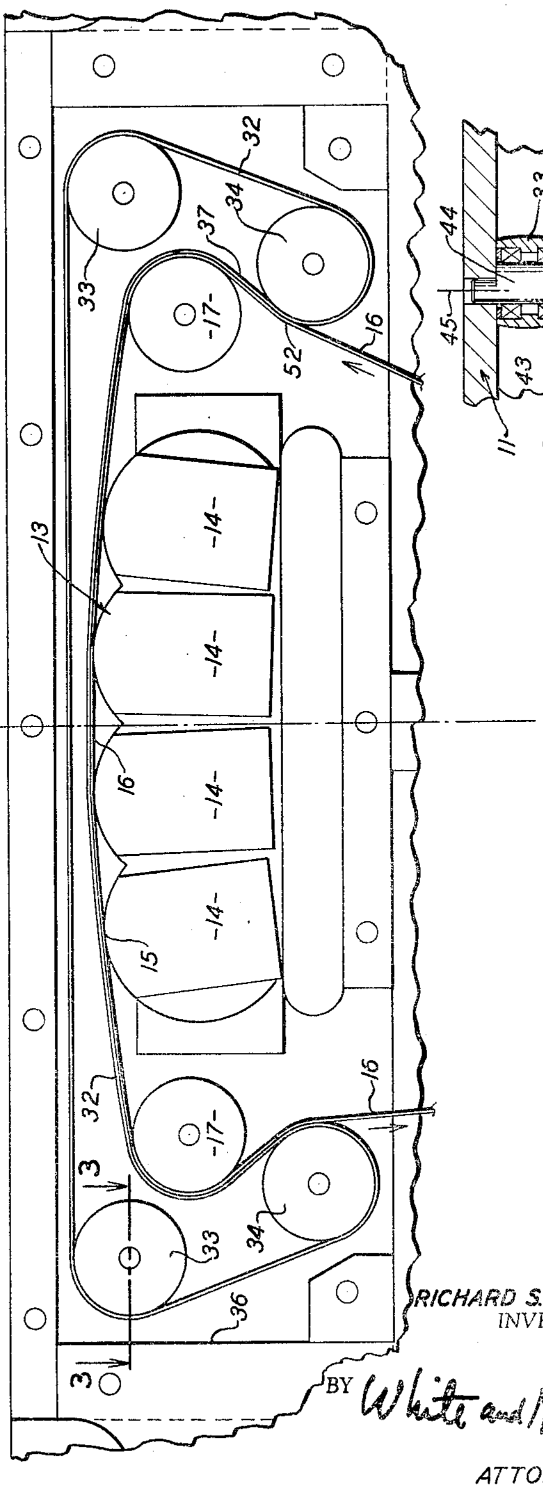
FIG. 4 is an enlarged plan view of the tape advancing and guiding mechanism shown in FIG. 1.

Rollers 33 function to engage and turn the belt, whereas rollers 34 engage and turn the belt and the rollers 17 engage the tape and turn both the tape and the belt. It is found that this construction accommodates self-threading of the tape, such as may for example be accomplished by introducing the free end of the tape between the rollers 34 and 17 so as to engage the belt at 37, the belt then frictionally carrying the tape end around and over the roller 17 and across the magnetic head structure to the opposite roller 17, where it is then returned and delivered for winding on the reel 19. Also, the clamping of the tape between the belt and each of the rollers 17 over a relatively large wrap-angle assures positive drive transmission from the belt to the tape. In this regard, the belt may typically be driven by either of the rollers 34, the remaining roller 34 and rollers 17 and 33 being idlers. As shown in FIGS. 1 and 2, the drive roller is in turn driven by a synchronous motor 38 carried by the chamber 10 and a drive belt 39 wrapping around the drive motor shaft 40 and the pulley 41 carried by the shaft 42 of the roller.

It is a feature of the invention that the tension of the tape drive belt 32 is kept substantially constant in order to minimize variations in the friction drive transmitted to the tape, this in turn helping to minimize perturbations or fluctuations in tape transport across the head structure. For this purpose, the endless belt is preferably seamless or free of ridges. Also, it is characterized as substantially non-stretching and may comprise a polyester plastic film such as that having the commercial trade name Mylar, this material being a product of E. I. du Pont de Nemours. It is found that this particular material has the coefficient of thermal expansion $15\times10^{-6}$ inches per inch per degree F. When the plates 11 and 12 which mount the rollers 33, 34 and 17 are made of aluminum having a coefficient of thermal expansion of about $12.4\times10^{-6}$ inches per inch per degree F., the plates and belt expand and contract with temperature change in substantially equal relation so as to maintain the belt tension substantially constant over a wide temperature range. Also, this particular belt material has a relatively high coefficient of friction of about .5 for positively frictionally driving the tape. Finally, this material has elasticity properties so related to the inertia of the belt drive system that the latter comprises a low-pass mechanical filter having a cut-off frequency or frequency range less than the torque pulsation frequency generated by the motor 38. Accordingly, the tape is substantially free of transmission thereto of torque pulsations generated by motor 38.

Figure 3:
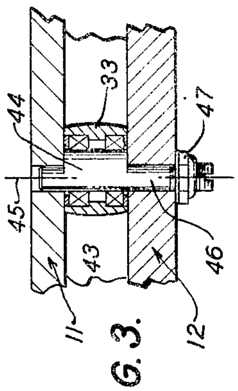
FIG. 3 is a fragmentary section showing the manner in which belt tension may be adjusted.

The drive belt thickness will in most instances be substantially greater than the tape thickness, and the frictional interengagement of the tape and belt will result in substantially reduced stretching or elongation of the tape extent traveling over the head structure as compared with tape elongation where the tape is driven by a pinch roller. This desirable result is important especially where the tape traverses more than one head, tape stretch increasing incrementally at successive heads in the direction of tape traverse thereof. In this regard, differential stretch of the tape may be considered as associated with input or output signal distortion. Finally, the belt tension may be infinitely varied within a selected range for best cooperation with the tape, as by adjusting a roller 33 to selected position corresponding to desired tension in the belt. FIG. 3 shows the adjustable roller 33 mounted between the plates 11 and 12 on bearings 43 carried by cylinder 44 having an eccentric axis 45 of rotation. An eccentric stem 46 integral with the cylinder 44 projects to the exterior of the plate 12 and has a nut 47 threaded thereon for tightening against the plate 12. When the nut is loosened the stem may be turned about axis 45 to adjust the position of the cylinder 44 and of the roller 33, after which the nut may be tightened to lock the roller in selected position corresponding to desired belt tension.

When the tape traverses each head 14, it changes direction, and in the past the required angular directional change or so-called wrap angle has typically been around 5 to 7 degrees. The present invention makes it possible to reduce this angularity, with typical angularity of 2 degrees, so that substantially reduced head wear results from tape contact with the head structure. At the same time, the belt clamping effect on the tape results in substantially reduced tape transport perturbations, with consequent reduction of flutter in the signal, as compared with previous devices utilizing pinch rollers to drive the tape. In this regard, the normal force exerted by the belt to clamp the tape against the head structure is substantially independent of reel tension, both static and dynamic.

Another advantage of the invention concerns the exact guiding of the tape across the head structure. For this purpose, the drive belt is maintained centered with respect to the rollers by slightly crowning the rollers 33, as is shown in FIG. 3. Also the sandwiched construction of the carrier 10 establishes the condition that the interior walls 50 and 51 of the plates 11 and 12 are spaced very close to the tape opposite edges to resist sideward deviation of the tape traveling between the rollers 34 and the reels 22 and 23. Accordingly, the tape is kept centered until it arrives in contact with the centered belt in the region 52, after which the tape is maintained centered by frictional contact with the belt as it travels across the head structure. Tests show no detectable wobble or sideward walking of the tape, and uniform tape stacking on the reels. Since the rollers, reels and other apparatus are symmetric with respect to the center plane 35, the same tape driving, guiding and centering relationships prevail during both forward and reverse drive of the belt 32 and the tape 16. In this regard, the belt drive may be said to dominate the tape or reel drive, the torque motors 24 and 25 acting to drive one reel to wind up the tape and to provide drag on the other reel, for preventing bunching of the tape.

Finally, it is noted that the sandwiched construction of the carrier 10 and its tape guiding function make possible the elimination of the tape storage reels, whereby the tape may be allowed to freely feed into and out of the chamber wells 119 and 120 or their equivalent. For example, the tape may comprise an endless loop, and reels may then be eliminated. Also lesser numbers of rollers may be used, as for example by rearranging the drive belt to eliminate need for rollers 33 and 34. Finally, the invention is applicable to other type tapes and heads, as for example punched tape traveling past punch or mark sensing head structure or apparatus.

I claim:

1. In appartus of the character described, magnetic head structure, tape adapted for magnetic cooperation with said head structure during tape traversal thereof, an endless essentially non-stretching drive belt, and means for advancing and guiding said belt to engage and frictionally drive the tape along a predetermined path concave toward and traversing said head structure, said means including a pair of tape engaging rollers about which the tape and belt are partially wrapped with the tape held clamped between the belt and rollers and at such locations at opposite sides of said head structure that the rollers hold the belt tensioned to clamp the tape against said head structure, said head structure including at least one head, said belt being endless and seamless and changing direction along said path with only slight change of angularity in traversing said head, said means including frame structure for supporting said rollers in predetermined spaced apart relation, the belt having predetermined tension and having a temperature coefficient of expansion close to that of said frame structure whereby the belt tension is maintained substantially constant with change of temperature, and said means including first and second pairs of belt engaging rollers, the rollers of each pair being at opposite sides of a plane bisecting said head structure, said first and second pairs of rollers turning the belt, each roller turning the belt through an angle greater than 90°, a drive for a capstan roller of said first and second pairs, and means acting to hold an adjustable roller of said first and second pairs in a selected position tending to maintain the belt tension.

2. The invention as defined in claim 1 including means for taking up and supplying said tape respectively from and to said belt, and a chamber having interior walls adjacent edges of the tape traveling from and to said belt for resisting sideward deviation of tape travel.

3. The invention as defined in claim 1 in which said drive is subject to torque pulsation, and said tensioned belt consists of plastic material and has a thickness and friction coefficient relation to the tape characterized in that the belt comprises a low-pass mechanical filter having a cut-off frequency less than the torque pulsation frequency communicated to the belt by said drive.

4. In apparatus of the character described, magnetic head structure adapted to cooperate magnetically with tape during tape traverse thereof, an endless essentially non-stretching drive belt, and means for advancing and guiding said belt to engage and frictionally drive the tape along a predetermined path concave toward and traversing said head structure, said means including a pair of tape engaging rollers about which the tape and belt are partially wrapped with the tape held clamped between the belt and rollers and at such locations at opposite sides of said head structure that the rollers hold the belt tensioned to clamp the tape against said head structure, said means including frame structure for supporting said rollers in predetermined spaced apart relation, the belt having predetermined tension, being seamless and having a temperature coefficient of expansion close to that of said frame structure whereby the belt tension is maintained substantially constant with change of temperature, said means including first and second pairs of belt engaging rollers, the rollers of each pair being at opposite sides of a plane bisecting said head structure, said first and second pairs of rollers turning the belt, each roller turning the belt through an angle greater than 90°, a drive for a capstan roller of said first and second pairs, and means acting to hold an adjustable roller of said first and second pairs in a selected position tending to maintain the belt tension.

5. The invention as defined in claim 4 including means for taking up and supplying said tape respectively from and to said belt, and a chamber having interior walls adjacent edges of the tape traveling from and to said belt for resisting sideward deviation of belt travel.

References Cited in the file of this patent

UNITED STATES PATENTS

| | | |
|---|---|---|
| 1,942,890 | Wittel | Jan. 9, 1934 |
| 2,793,253 | Howey | May 21, 1957 |
| 2,891,736 | Blaes | June 23, 1959 |
| 3,057,529 | Fitch | Oct. 9, 1962 |
| 3,114,512 | Peshel et al. | Dec. 17, 1963 |

FOREIGN PATENTS

| | | |
|---|---|---|
| 687,927 | Great Britain | Feb. 25, 1953 |